Jan. 19, 1937. R. L. MESSERLY 2,068,346
MEANS FOR SHAPING AND TRANSFERRING SUBSTANCES INTO RECEPTACLES
Filed Oct. 24, 1935
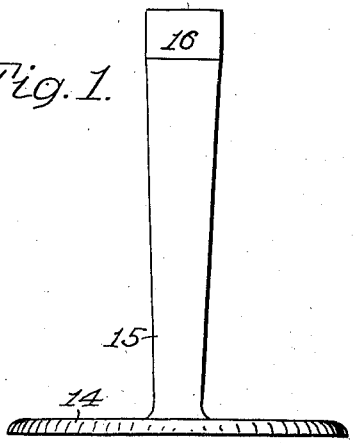
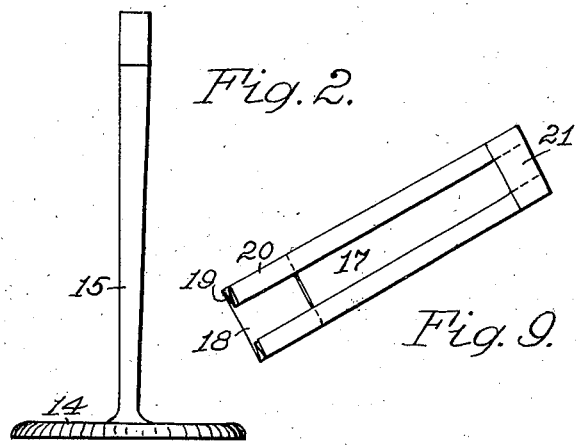
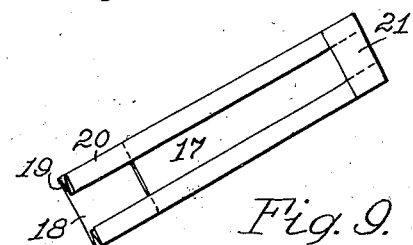
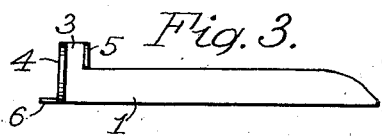
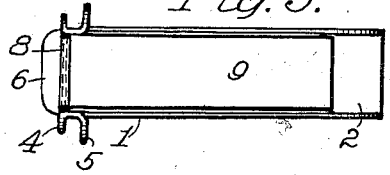
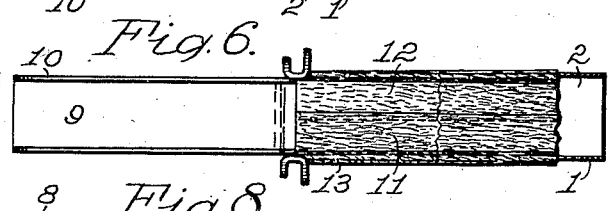
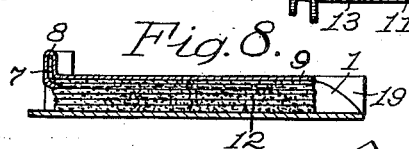
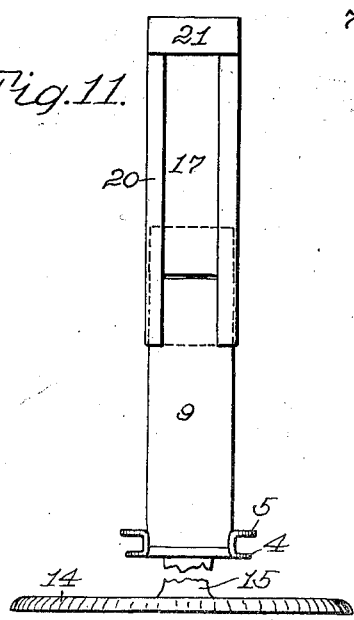
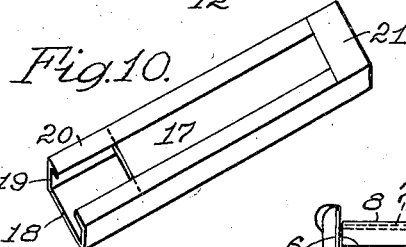
Inventor
Roger L. Messerly,
By G. C. Kennedy.
Attorney Patented Jan. 19, 1937

2,068,346

UNITED STATES PATENT OFFICE 2,068,346

MEANS FOR SHAPING AND TRANSFERRING SUBSTANCES INTO RECEPTACLES

Roger L. Messerly, Waterloo, Iowa, assignor to The Rath Packing Company, Waterloo, Iowa, a corporation of Iowa Application October 24, 1935, Serial No. 46,472

2 Claims. (Cl. 226—18)

My invention relates to improvements in means for packing substances into containers.

An object of my improvements is to pack certain food or other products or substances into containers, while including in means therefor suitable trays or molds in which the substances are placed and therein molded or otherwise shaped to fit the same, and in this shape to fit a container into which the same is to be placed, such as a carton or other casing, or other receptacle suitable for sealing and transportation as an article of merchandise.

Another object of my improvements is to provide a molding tray for the purpose described, easily handled and filled by hand or otherwise, and having a slidably hingedly mounted pressure cover therefor suitable to fulfill certain purposes of my invention, its mechanical embodiment and its steps.

Another object of my improvements is to construct the tray to be associated with an auxiliary relatively stationary packer member, arranged and formed to at a certain stage of the process enter said packed tray and a container member mounted thereover, to compress the substance to be packed into the container, while displacing the container as thus filled from the packer member, to permit the filled container to be closed or sealed in due course in any desired manner.

Another object of my improvements is to shape the tray to be associated with the tray and packer member a collapsible casing having one open and one closed end, and having one relatively rigid longitudinal wall and other wall parts of thin flexible collapsible material, the tray and packer member being designed for coaction with said container both before and after it is filled.

It is to be understood that other or equivalent means may be used without departing from my invention or from the scope of my claims.

I have accomplished the above objects by the use of the tray device which is illustrated in the accompanying drawing.

Figs. 1 and 2 are respectively elevations of the packer member, Fig. 2 displaying this device at an angle of ninety degrees from and relative to Fig. 1. Fig. 3 is a side elevation of the tray, and Fig. 4 is a vertical medial longitudinal section thereof showing the compressor lid therefor swung thereinto. Fig. 5 is a top plan of said tray as shown in Fig. 4, and Fig. 6 is a top plan of the tray shown in Fig. 5 with a substance placed in part within the tray as during the manual process of filling the tray, the lid being opened. Fig. 7 is an end elevation of the tray, showing the slidazle hinged connection of the lid to that end of the tray for tilting movements, and relative displacements in one direction within the tray. Fig. 8 is a medial longitudinal section of the filled tray with its compressor lid closed upon the filling thereof. Fig. 9 is a perspective view of a container or casing having one relatively rigid wall and other wall parts flexible and collapsed thereupon, and Fig. 10 is a perspective view of this casing as extended and empty, with an open end to receive a filling of the substance to be packed therein during the operation of said mechanical devices. Fig. 11 is an elevation of the packer member, and the incased filled tray associated slidably therewith.

Like numerals of reference refer to like parts of said elements and their parts throughout the several views.

The packer body referred to of said Figs. 1 and 2 comprises a flattened base body 14 having an integral standard 15 central thereon terminating upwardly preferably in a rectangular packer head 16, but which may be otherwise shaped to fit a shaped substance and the tray containing it. The standard 15 is reduced in cross section downwardly from the packer head 16 to insure easy and prompt release of the tray and casing therefrom and to prevent sticking.

Figs. 9 and 10 display an associated carton or casing of a type which is particularly suitable for use in packaging certain substances such as food products, particularly sliced dried beef or the like. This carton is usually shaped as shown, to be filled by such a food or other product by the means shown in the drawing as will be hereinafter fully elucidated. This special carton or casing has an elongated rectangular shape, and stiff enough to keep extended under ordinary handling. It thus trusses and secures in either extended or collapsed positions the collapsible opposite side walls 19 of more flexible material than the wall part 17, which extend angularly from the medial flexible part 18 and which side walls have end parts 20 secured upon the part 17, and with one end of the casing closed by cementing of its parts together. The other end of the casing remains open until the casing is filled.

In Figs. 3 to 8 inclusive is shown the molding tray used in the filling and packing operations of my invention. This tray has a bottom wall 2 with raised side walls 1, and open top and ends. One end of the tray has its side wall angles beveled for a purpose to be described. At the opposite end, the tray has a projection 6 for grasping by an operator, and has raised parts 3 of its side walls 1, provided at opposite sides with pairs of ears 4 and 5, whose use is to be described. The tray has a lid 9 with opposite depending tread flanges 10 when the lid is closed as shown in Fig. 4. One end of the lid has a loop or closed bend 8 extending at approximately a right angle therefrom, affording an open seat therealong in which a pintle 7 is received, the ends of the pintle being fixed to the side walls of the tray, so that the lid is both pivotally or hingedly and also slidably seated on the pintle. When, as in Fig. 4 the lid is swung into the tray, or as in Fig. 8 the lid is slidably raised to rest as a whole upon the filling substance 11 in the tray, the lid constitutes a top closure for the tray but which may enter the interspace of the side walls 1 when the operator presses the lid into the tray to press and consolidate the filling.

In the latter working position, the pintle 7 is located about midway of the length of the slotted bearing of said loop 8. In the first position shown in Fig. 4, the pintle is at the top of the slot. When the lid is swung open as in Fig. 6, the pintle is also at the top of the slot, but the loop 8 is reversed in its position relative to the bottom of the tray to closely approach it, hence provides an end closure for the tray.

The operation of this invention is accomplished by successive steps in the following manner. The standard and packer head 15 and 16 is supported by its flat base 14 upon a table before an operator. The operator places the opened tray (see Fig. 6) upon the table, and manually packs therein successive overlapped layers of the substance composing the filling as shown for instance in thin slices of dried beef at 11 and 12, the lowermost layer being carried upwardly along the inner side walls 1 and overlapped at their edges preferably outwardly at 13 as shown, whereby the inner faces comprising the bottom and side walls of the tray are covered by the slices. Other slices are then deposited in the like superincumbent positions as a filling. The overlapped portions 13 are then turned inwardly upon the filling, and the operator swings to closed position the lid 9 (see Fig. 8), pressing fingers upon the lid to smoothly consolidate the whole filling compactly into an elongated oblong block.

In the following step, the operator takes up an opened casing of the shape shown in Fig. 10 to loosely fit upon the tray and block of filling of the tray, and slips the open end of the casing over the tray as filled. The operator then upends the casing covered filled tray and, as shown in said Fig. 11 pushes the open end of the casing downwardly upon and over the packer head 16 of the standard 15, while grasping the casing and contained tray in one hand, and with the other hand pressing upon the stop ears 5, or grasping the pair 5 and 4 of the ears on one side of the tray with fingers of the other hand. The pushing down of the casing over the packer head 16 contacts the abutting end of the filling 11 and 12 therewith, and the operator then removes the casing upwardly from the tray and lays it aside, the tray remaining upon the standard to be removed upwardly.

It will be understood that by the above operation the casing is with its contents entirely withdrawn from about the tray, as the side walls 1, bottom 2, and lid 9 are held by the operator fixedly upon the standard 15—16 with one hand, while the filled casing is removed from the standard and its head 16 with the other hand. Then the operator, or another, takes the filled casing and carries over the end flaps at 18, 19 and 20 and cements them over and upon the abutting end part of the stiff side wall 17 of the casing.

This invention is especially adapted for employment in meat packing plants, where rapid handling is essential, while preserving a standard shape to the cased filling as moderately compressed for retaining moisture and a good appearance as seen through a diaphanous wrapper constituting the more flexible walls of the casing.

I claim:

1. A packing and shaping mold-tray adapted to transfer its shaped contents in a single coherent body into and to fit the interior of a casing, comprising a body member having a bottom wall, raised side walls, and having an open top and open ends, and a compression lid mounted between the side walls and having an upset end part within an end part of the tray and both pivotally and slidably connected to the side walls and serving to shape the contents of the tray coherently, the lid when opened and swung rearwardly out of the tray subsiding to cause said upset end part to close that end of the tray.

2. A packing and shaping mold-tray adapted to transfer its contents into and fit the interior of a casing, comprising a body member having a bottom wall, raised side walls having at one end of said member raised ears connected by a transverse rod, and a lid mounted between the side walls and having one end upset and slidably and pivotally mounted on said rod, the tray when filled and the lid lowered to shape the contents of the tray being adapted to be used to be transferred with its contents into a fitting casing endwise and then removed alone from the casing.

ROGER L. MESSERLY.